(12) United States Patent
Hutcherson

(10) Patent No.: US 7,407,323 B2
(45) Date of Patent: Aug. 5, 2008

(54) METHODS AND SYSTEMS FOR DETERMINING TEMPERATURE OF AN OBJECT

(75) Inventor: David R. Hutcherson, Somerset (GB)

(73) Assignee: GE Infrastructure Sensing Inc., Billerica, MA (US)

( * ) Notice: Subject to any disclaimer, the term of this patent is extended or adjusted under 35 U.S.C. 154(b) by 52 days.

(21) Appl. No.: 11/347,712

(22) Filed: Feb. 3, 2006

(65) Prior Publication Data

US 2007/0183475 A1   Aug. 9, 2007

(51) Int. Cl.
*G01K 15/00* (2006.01)

(52) U.S. Cl. .............................. 374/1; 374/129; 374/121

(58) Field of Classification Search ......... 374/120–121, 374/1, 129, 2, 133; 600/474, 549; 702/2
See application file for complete search history.

(56) References Cited

U.S. PATENT DOCUMENTS

| | | | | |
|---|---|---|---|---|
| 3,777,568 A | * | 12/1973 | Risgin et al. ................. | 374/128 |
| 4,215,336 A | * | 7/1980 | Smith ..................... | 340/870.17 |
| 4,251,291 A | | 2/1981 | Gomez | |
| 4,301,682 A | * | 11/1981 | Everest ....................... | 374/112 |
| 4,358,957 A | * | 11/1982 | Lougheed et al. ........... | 374/134 |
| 6,048,093 A | * | 4/2000 | Pompei ...................... | 374/133 |
| 6,241,384 B1 | * | 6/2001 | Pompei et al. .............. | 374/126 |
| 6,499,877 B2 | * | 12/2002 | Pompei ...................... | 374/133 |
| 6,820,897 B2 | | 11/2004 | Breed et al. | |
| 7,084,342 B2 | * | 8/2006 | Schuh ........................ | 136/230 |
| 2002/0140215 A1 | | 10/2002 | Breed et al. | |
| 2004/0057494 A1 | * | 3/2004 | Tsao et al. .................. | 374/121 |
| 2004/0058488 A1 | | 3/2004 | Arno | |
| 2004/0066832 A1 | * | 4/2004 | Lin et al. .................... | 374/120 |
| 2004/0075544 A1 | | 4/2004 | Janssen | |
| 2005/0094705 A1 | * | 5/2005 | Chi ............................ | 374/121 |

* cited by examiner

*Primary Examiner*—Gail Verbitsky
(74) *Attorney, Agent, or Firm*—Mark Conklin, Esq.; Armstrong Teasdale LLP

(57) ABSTRACT

Methods and systems for detecting a temperature $T_O$ of a remote object are provided. The method includes storing in memory, a lookup table relating an output voltage of an infrared sensor to a temperature sensed by the infrared sensor $V(T_O, T_A)$, determining a temperature sensor voltage output corresponding to a temperature $T_A$ proximate the infrared sensor, determining a first voltage as a function of the temperature $T_A$ proximate the infrared sensor and a reference temperature $T_{REF}$, $V(T_A, T_{REF})$, determining a second voltage as a function of the temperature of the object $T_O$ and the reference temperature $T_{REF}$, $V(T_O, T_{REF})$ by combining the determined temperature sensor voltage output and the first voltage, and determining a temperature of the object $T_O$ from the lookup table using the second voltage.

16 Claims, 3 Drawing Sheets

| Calculated Characteristic | | | Calculate $T_O$ (Linear Interpolation) | | |
|---|---|---|---|---|---|
| $T_O$ | $T_O$ | $V(T_O, T_{REF})$ | $T_O$ | Error in $T_O$ | |
| °C | K | mV | °C | °C | |
| 45.00 | 318.15 | 1.352 | 45.000 | 0.000 | LUT Data Point |
| 45.50 | 318.65 | 1.389 | 45.490 | -0.010 | |
| 46.00 | 319.15 | 1.427 | 45.982 | -0.018 | |
| 46.50 | 319.65 | 1.464 | 46.477 | -0.023 | |
| 47.00 | 320.15 | 1.502 | 46.973 | -0.027 | |
| 47.50 | 320.65 | 1.539 | 47.472 | -0.028 | |
| 48.00 | 321.15 | 1.577 | 47.973 | -0.027 | |
| 48.50 | 321.65 | 1.616 | 48.476 | -0.024 | |
| 49.00 | 322.15 | 1.654 | 48.982 | -0.018 | |
| 49.50 | 322.65 | 1.692 | 49.490 | -0.010 | |
| 50.00 | 323.15 | 1.731 | 50.000 | 0.000 | LUT Data Point |

FIG. 3

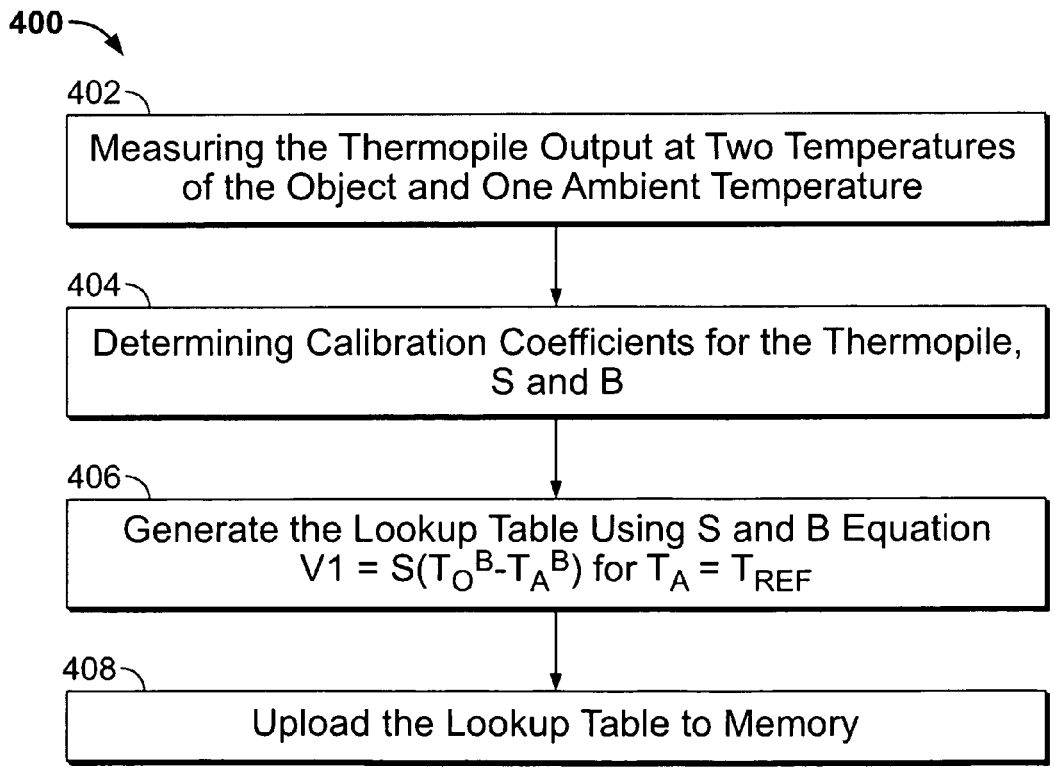

402 — Measuring the Thermopile Output at Two Temperatures of the Object and One Ambient Temperature 404 — Determining Calibration Coefficients for the Thermopile, S and B 406 — Generate the Lookup Table Using S and B Equation $V1 = S(T_O^B - T_A^B)$ for $T_A = T_{REF}$ 408 — Upload the Lookup Table to Memory

FIG. 4

METHODS AND SYSTEMS FOR DETERMINING TEMPERATURE OF AN OBJECT

BACKGROUND OF THE INVENTION

This invention relates generally to temperature sensors, and more particularly to methods and apparatus for deriving an object temperature using an IR thermopile sensor to over a wide range of object and ambient temperatures based on a single compact lookup table.

Infrared (IR) thermopile sensors are used to measure the temperature of remote objects. The output voltage of the thermopile sensor varies with both object temperature and ambient temperature of the sensor. Although the general shape of the characteristics curve is known, there are relatively large variations between contributions of individual parts of the sensor to the characteristics curve. For accurate measurement each sensor is individually calibrated at known temperatures. During normal operation, the calibration data is used in conjunction with the measured ambient temperature to give an accurate indication of object temperature. However, the relationship between output voltage and temperature is a 4th power equation requiring a significant computational requirement to solve.

BRIEF DESCRIPTION OF THE INVENTION

In one embodiment, a method for detecting a temperature $T_O$ of a remote object includes storing in memory, a lookup table relating an output voltage of an infrared sensor to a temperature sensed by the infrared sensor $V(T_O, T_A)$, determining a temperature sensor voltage output corresponding to a temperature $T_A$ proximate the infrared sensor, determining a first voltage as a function of the temperature $T_A$ proximate the infrared sensor and a reference temperature $T_{REF}$, $V(T_A, T_{REF})$, determining a second voltage as a function of the temperature of the object To and the reference temperature $T_{REF}$, $V(T_O, T_{REF})$ by combining the determined temperature sensor voltage output and the first voltage, and determining a temperature of the object $T_O$ from the lookup table using the second voltage.

In another embodiment, a system for determining a temperature of a remote object includes an infrared temperature sensor, a temperature sensor configured to detect a temperature of the infrared sensor, a memory including a lookup table of infrared temperature sensor output voltage versus object temperature and associated information, and a processor communicatively coupled to the infrared temperature sensor, temperature sensor, and memory. The processor is programmed to store in memory, a lookup table relating an output voltage of an infrared sensor to a temperature sensed by the infrared sensor $V(T_O, T_A)$, determine a voltage output of the temperature sensor that corresponds to a temperature $T_A$ proximate the infrared temperature sensor, determine a first voltage as a function of the temperature $T_A$ proximate the infrared sensor and a reference temperature $T_{REF}$, $V(T_A, T_{REF})$, determine a second voltage as a function of the temperature of the object $T_O$ and the reference temperature $T_{REF}$, $V(T_O, T_{REF})$ by combining the determined temperature sensor voltage output and the first voltage, and determine a temperature of the object $T_O$ from the lookup table using the second voltage.

In yet another embodiment, a computer program embodied on a computer readable medium for detecting a temperature $T_O$ of a remote object is provided. The computer program includes a code segment that stores in memory, a lookup table relating an output voltage of an infrared sensor to a temperature sensed by the infrared sensor $V(T_O, T_A)$, determines a temperature sensor voltage output corresponding to a temperature $T_A$ proximate the infrared sensor, determines a first voltage as a function of the temperature $T_A$ proximate the infrared sensor and a reference temperature $T_{REF}$, $V(T_A, T_{REF})$, determines a second voltage as a function of the temperature of the object $T_O$ and the reference temperature $T_{REF}$, $V(T_O, T_{REF})$ by combining the determined temperature sensor voltage output and the first voltage, and determines a temperature of the object $T_O$ from the lookup table using the second voltage.

BRIEF DESCRIPTION OF THE DRAWINGS

FIG. 3 is a table illustrating results of an alternative exemplary technique for a lookup table using interpolation between adjacent data pairs;

FIG. 4 is a flow diagram of an exemplary method of generating a lookup table of $T_O$ versus a voltage as a function of the temperature of the object $T_O$ and the ambient temperature $T_A(V(T_O, T_A))$.

DETAILED DESCRIPTION OF THE INVENTION

Figure 1:
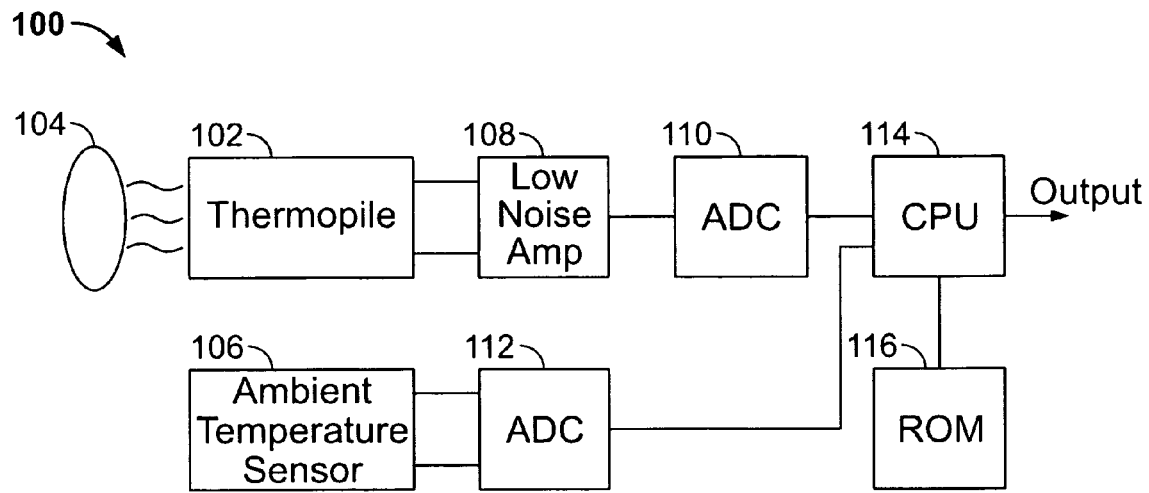
FIG. 1 is a block diagram of a thermopile sensor system in accordance with an exemplary embodiment of the present invention.

FIG. 1 is a block diagram of a thermopile sensor system 100 in accordance with an exemplary embodiment of the present invention. System 100 includes a thermopile detector 102 configured to receive infrared radiation that is correlative to the temperature $T_O$ of a remote object 104. Thermopile detector 102 provides a low level analog output varying with both object temperature $T_O$ and ambient temperature $T_A$. An ambient temperature sensor 106, used to measure the ambient temperature of the thermopile is located proximate to thermopile detector 102. In the exemplary embodiment, ambient temperature sensor 106 is a thermistor. In various alternative embodiments, ambient temperature sensor 106 is a silicon temperature sensor or resistance temperature detector (RTD).

Thermopile detector 102 is communicatively coupled to a low noise amplifier 108 and to analog-to-digital converter 110. Ambient temperature sensor 106 is communicatively coupled to analog-to-digital converter 112. The outputs of analog-to-digital converters 110 and 112 are transmitted to computer 114. A memory 116, such as a read only memory (ROM) is communicatively coupled to computer 114.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

Computer 114 executes a set of instructions that are stored in one or more storage elements, in order to process input data. The storage elements may also store data or other information as desired or needed. The storage element may be in the form of an information source or a physical memory element within or communicatively coupled to computer 114.

The set of instructions may include various commands that instruct computer 114 as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

In the exemplary embodiment, memory 116 is used to store a lookup table (LUT) of thermopile output voltage versus object temperature characteristic, along with associated information. Processor 114 is used to perform the necessary calculations and lookup processes.

Figure 2:
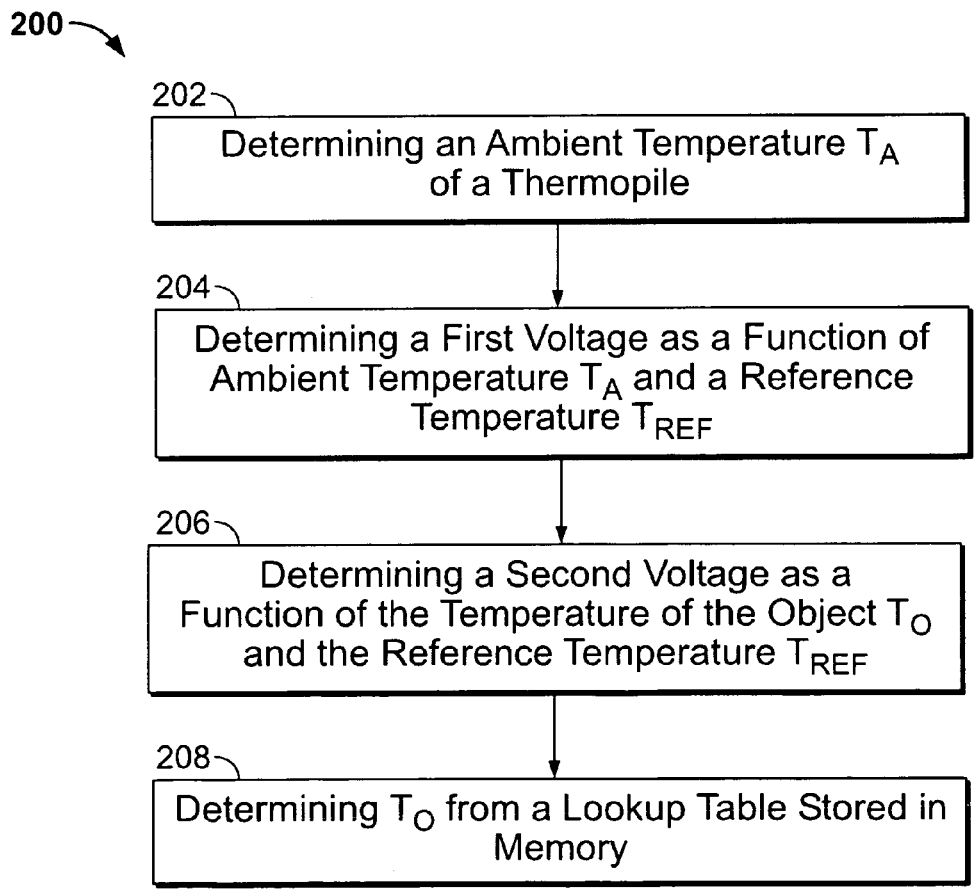
FIG. 2 is a flow diagram of an exemplary method of determining a temperature of an object $T_O$.

FIG. 2 is a flow diagram of an exemplary method 200 of determining a temperature of an object $T_O$. Method 200 includes determining 202 an ambient temperature $T_A$ of thermopile 102, determining 204 a first voltage as a function of ambient temperature $T_A$ and a reference temperature $T_{REF}$, for example, 25° Celsius. Method 200 also includes determining 206 a second voltage as a function of the temperature of the object $T_O$ and the reference temperature $T_{REF}$ and determining 208 $T_O$ from a lookup table stored in memory.

A simple technique for using a lookup table is to output data from the data pair closest to the inputted value. This will lead to varying errors, being at a maximum when the true value is midway between adjacent data pairs. The errors can be reduced by using smaller intervals between the data points, however using smaller intervals requires larger lookup tables with a corresponding demand on memory size.

FIG. 3 is a table 300 illustrating results of an alternative exemplary technique for a lookup table using interpolation between adjacent data pairs. A column 302 illustrates LUT data pairs at 5° C. intervals, for example, 45.00° C. and 50.00° C. and shows the calculated temperatures at intermediate temperatures (0.5° C. steps) using linear interpolation. A column 304 illustrates a temperature on the Kelvin scale corresponding to the temperature shown in column 302. A column 306 illustrates a voltage as a function of the temperature of the object $T_O$ and the reference temperature $T_{REF}$, for example, 25° C. A column 308 illustrates a calculated $T_O$ using linear interpolation, and a column 310 shows a corresponding error in the calculated $T_O$ using linear interpolation.

FIG. 4 is a flow diagram of an exemplary method 400 of generating a lookup table of $T_O$ versus a voltage as a function of the temperature of the object $T_O$ and the ambient temperature $T_A$(V($T_O$, $T_A$)). Method 400 includes measuring 402 thermopile 102 output at two temperatures of object 104 and one ambient temperature. In the exemplary embodiment, ambient temperature $T_A$ equals approximately $T_{REF}$, for example, 25° C. Method 400 includes determining 404 calibration coefficients S and B by:

Assume $V = S(T_O^B - T_A^B)$, where

V=Output voltage from thermopile,
$T_O$=Object temperature in K
$T_A$=Ambient temperature in K
S=Sensitivity coefficient
B=Coefficient (approximately 4)

S and B can be determined by measurements at two conditions ($T_{O1}$, $T_{A1}$). ($T_{O2}$, $T_{A2}$) ensuring that where $T_O$ does not equal $T_A$)

$$V_1 = S(T_O^B - T_A^B) \qquad \text{Equation 1}$$

$$V_2 = S(T_A^B - T_{REF}^B) \qquad \text{Equation 2}$$

Divide Equation 2 by Equation 1:

$$V_2/V_1 = (T_O^B - T_A^B)/(T_A^B - T_{REF}^B)$$

B is determined using numerical iteration.
Equation 1 is rearranged to solve for S.

$$S = V_1/(T_O^B - T_A^B) \qquad \text{Equation 3}$$

S can now be calculated from $V_1$ and B
S and B are used 406 in Equation 1 to generate the look-up table for the $T_A = T_{REF}$ condition and the look-up table is uploaded 408 to ROM 116.

| $T_O$ | V($T_O$, $T_A$) |
|---|---|
| | |

For fixed temperature intervals, values of $T_O$ are not saved in the look-up table, but are calculated from the index position of the data point in the table.

The lookup table is used to determine V($V_A$, $T_{REF}$) at 204 (shown in FIG. 2).

Figure 5:
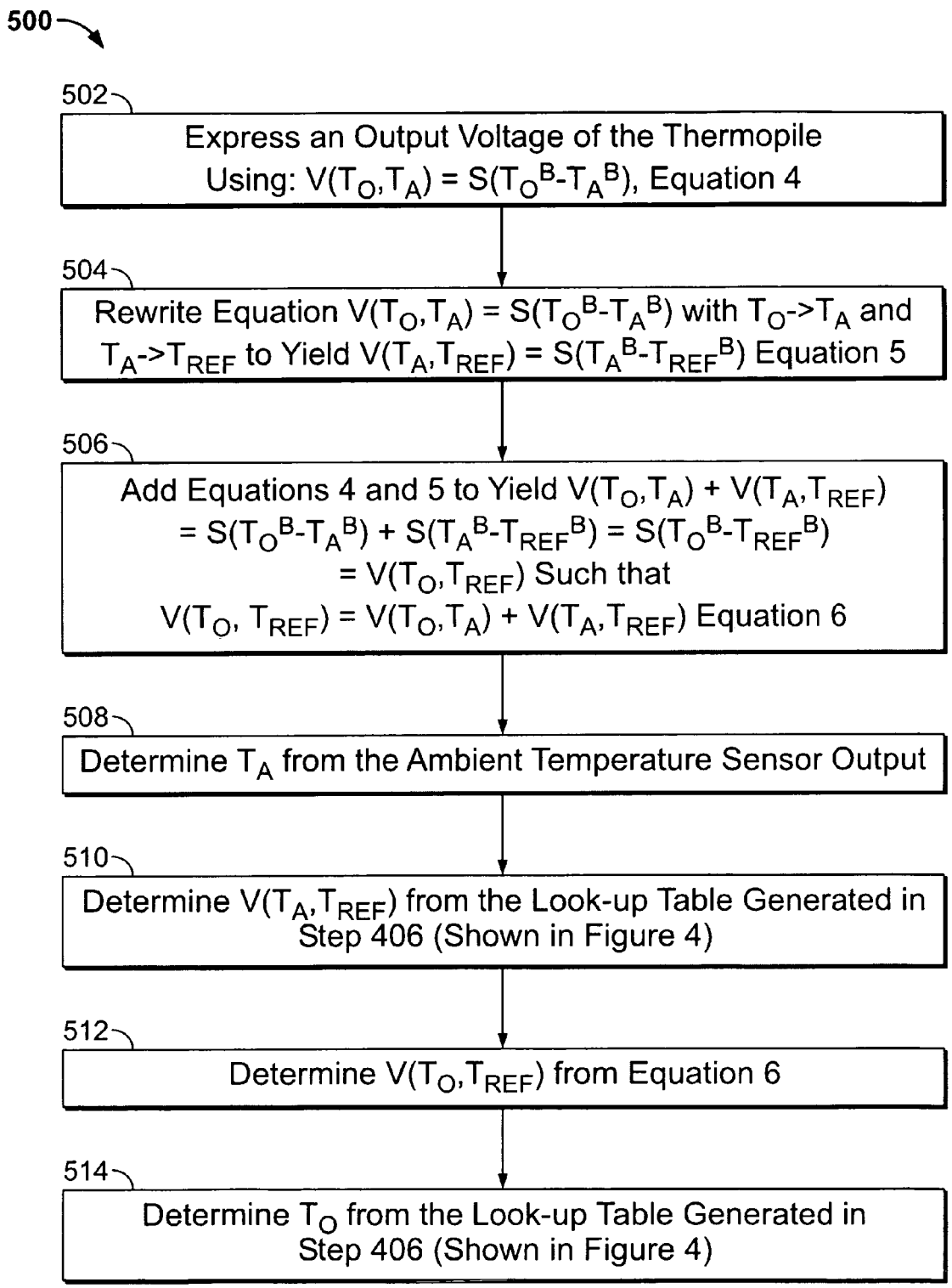
FIG. 5 is a flow diagram of an exemplary method of determining an equation for a voltage as a function of the temperature of the object $T_O$ and the reference temperature $T_{REF}(V(T_O, T_{REF}))$

FIG. 5 is a flow diagram of an exemplary method 500 of determining an equation for a voltage as a function of the temperature of the object $T_O$ and the reference temperature $T_{REF}$(V($T_O$, $T_{REF}$)).

The output voltage of thermopile is expressed 502 using:

$$V(T_O, T_A) = S(T_O^B - T_A^B), \text{ where} \qquad \text{Equation 4}$$

V($T_O$, $T_A$) represents the output voltage from the thermopile,
$T_O$ represents the object temperature in degrees Kelvin,
$T_A$ represents ambient (detector) temperature in degrees Kelvin,
S, B represents calibration coefficients determined by practical measurements Rewriting 504 Equation 4 with $T_O \to T_A$ and $T_A \to T_{REF}$ where $T_{REF}$ is a reference temperature, equation 4 yields:

$$V(T_A, T_{REF}) = S(T_A^B - T_{REF}^B) \qquad \text{Equation 5}$$

Adding 506 equations 4 and 5 yields:

$$V(T_O, T_A) + V(T_A, T_{REF}) = S(T_O^B - T_A^B) + \qquad \text{Equation 6}$$
$$S(T_A^B - T_{REF}^B)$$
$$= S(T_O^B - T_{REF}^B)$$
$$= V(T_O, T_{REF})$$

$$V(T_O, T_{REF}) = V(T_O, T_A) + V(T_A, T_{REF})$$

During normal operation, $T_O$ is calculated 508 by determining $T_A$, which is calculated from the ambient temperature sensor output. V($T_A$, $T_{REF}$) is determined 510 from the look-up table. V($T_O$, $T_{REF}$) is determined 512 from Equation 6, and then $T_O$ is determined 514 from the look-up table.

The following example is based on a sensor for which calibration coefficients S & B have been derived from practical measurements.

| Calibration coefficients | | |
|---|---|---|
| S | 1.249E−09 | |
| B | 3.871 | |
| Reference temperature | | |
| $T_A = T_{REF}$ | 25.00 | °C. |
| $T_A = T_{REF}$ | 298.15 | K |
| Calculate lookup table | | |
| $T_O$ °C. | $T_O$ K | $V(T_O, T_{REF})$ mV |
| Start | | |
| 25 | 298.15 | 0.000 |
| 30 | 303.15 | 0.315 |
| 35 | 308.15 | 0.645 |
| 40 | 313.15 | 0.990 |
| 45 | 318.15 | 1.352 |
| 50 | 323.15 | 1.731 |
| 55 | 328.15 | 2.127 |
| 60 | 333.15 | 2.540 |
| 65 | 338.15 | 2.972 |
| 70 | 343.15 | 3.422 |
| 75 | 348.15 | 3.892 |
| 80 | 353.15 | 4.381 |
| 85 | 358.15 | 4.891 |
| End | | |
| Application conditions | | |
| $T_O$ | 60.00 | °C. |
| $T_O$ | 333.15 | K |
| $T_A$ | 45.00 | °C. |
| $T_A$ | 318.15 | K |
| Calculated output | | |
| $V(T_O, T_A)$ | 1.1879 | mV |
| Reverse calculation of $T_0$ from voltage | | | |
| $T_A$ | 45.00 | °C. | Notes |
| $V(T_A, T_{REF})$ | 1.352 | mV | Read from LUT |
| $V(T_O, T_{REF})$ | 2.540 | mV | $V(T_O, T_A)$ + $V(T_A, T_{REF})$ |
| $T_O$ | 60.00 | °C. | Read from LUT |

The method of the various embodiments of the present invention use techniques for using look-up tables that facilitate improving the accuracy of the measurement. The simplest technique for using a lookup table is to output data from the data pair closest to the inputted value. This will lead to varying errors, being at a maximum when the true value is midway between adjacent data pairs. The errors can be reduced by using smaller intervals between the data points, but this approach can require large tables with a corresponding demand on memory size.

The above-described embodiments of infrared radiation temperature sensors provides a cost-effective and reliable means for calculating the temperature of an object viewed by a thermopile. More specifically, an algorithm is generated using a single dimension look up table in conjunction with a linear interpolation to determine the temperature of the object viewed by the thermopile, rather than using a two dimensional lookup table. As a result, an infrared radiation based temperature sensor system is provided that facilitates determining temperature of a remote object using limited computing power.

Exemplary embodiments of infrared temperature measuring systems are described above in detail. The measuring system components illustrated are not limited to the specific embodiments described herein, but rather, components of each measuring system may be utilized independently and separately from other components described herein. For example, the measuring system components described above may also be used in combination with other measuring systems. As used herein, objects includes people, vehicles, packages, animals, buildings, or any other object.

While the invention has been described in terms of various specific embodiments, those skilled in the art will recognize that the invention can be practiced with modification within the spirit and scope of the claims.

What is claimed is:

1. A method of detecting a temperature $T_O$ of a remote object, said method comprising:

measuring an output of an infrared sensor directed toward the remote object at two temperatures of the remote object and a temperature $T_A$ proximate the infrared sensor;

determining calibration coefficients S and B from the measured output at the two temperatures;

determining a voltage output of a temperature sensor, the voltage output corresponding to the temperature $T_A$, $V(T_O, T_A)$;

generating a lookup table relating the output voltage of the infrared sensor to the temperature sensed by the infrared sensor, $V(T_O, T_A)$ versus the temperature $T_O$ of the object at a plurality of temperatures using the determined values of S and B;

storing the lookup table in a memory;

determining a temperature sensor voltage output corresponding to a temperature $T_A$ proximate the infrared sensor;

determining a first voltage as a function of the temperature $T_A$ proximate the infrared sensor and a reference temperature $T_{REF}$, $V(T_A, T_{REF})$;

determining a second voltage as a function of the temperature of the object $T_O$ and the reference temperature $T_{REF}$, $V(T_O, T_{REF})$ by combining the determined temperature sensor voltage output and the first voltage; and determining a temperature of the object $T_O$ from the lookup table using the second voltage.

2. A method in accordance with claim 1 wherein a voltage output of the infrared sensor is given by $V=S(T_O^B-T_A^B)$, where V=output voltage from thermopile,
    $T_O$=object temperature in °K
    $T_A$=ambient temperature in °K
    S=sensitivity coefficient
    B=calibration coefficient, and wherein determining calibration coefficients S and B comprises:

measuring a first voltage output of the infrared sensor at a first temperature such that $V_1=S(T_O^B-T_A^B)$;

measuring a second voltage output of the infrared sensor at a second temperature such that $V_2=S(T_A^B-T_{REF}^B)$;

combining the first voltage output and the second voltage output such that $V_2/V_1=(T_O^B-T_A^B)/(T_A^B-T_{REF}^B)$ determining B using numerical iteration; and determining S by solving $V_1=S(T_O^B-T_A^B)$ for S such that $S=V1/(T_O^B-T_A^B)$ using the measured value for V1 and the determined value for B.

3. A method in accordance with claim 1 wherein determining a first voltage, $V(T_A, T_{REF})$ comprises determining a first voltage $V(T_A, T_{REF})$ using $V(T_A, T_{REF})=S(T_O^B-T_A^B)$.

4. A method in accordance with claim 1 wherein determining a second voltage, $V(T_O, T_{REF})$ comprises determining a second voltage, $V(T_O, T_{REF})$ using $V(T_O, T_{REF})=(T_O, T_A)+(T_A, T_{REF})$.

5. A system for determining a temperature of a remote object comprising:
   an infrared temperature sensor;
   a temperature sensor configured to detect a temperature of the infrared sensor;
   a memory comprising a lookup table comprising a plurality of data points that relate the temperature sensor voltage output corresponding to a temperature $T_A$ proximate the infrared sensor, $V(T_O, T_A)$ for infrared sensor outputs at a plurality of temperatures of the object and temperatures $T_A$ proximate the infrared sensor; and
   a processor communicatively coupled to said infrared temperature Sensor, temperature sensor, and memory wherein the processor is programmed to:
   store in memory, a lookup table relating an output voltage of an infrared sensor to a temperature sensed by the infrared sensor $V(T_O, T_A)$;
   determine a voltage output of the temperature sensor that corresponds to a temperature $T_A$ proximate the infrared temperature sensor;
   determine a first voltage as a function of the temperature $T_A$ proximate the infrared sensor and a reference temperature $T_{REF}$, $V(T_A, T_{REF})$;
   determine a second voltage as a function of the temperature of the object $T_O$ and the reference temperature $T_{REF}$, $V(T_O, T_{REF})$ by combining the determined temperature sensor voltage output and the first voltage; and
   determine a temperature of the object $T_O$ from the lookup table using the second voltage.

6. A system in accordance with claim 5 wherein a voltage output of the infrared sensor is given by $V=S(T_O^B-T_A^B)$, where
   $V$=output voltage from thermopile,
   $T_O$=object temperature in ° K
   $T_A$=ambient temperature in ° K
   $S$=sensitivity coefficient
   $B$=calibration coefficient, and
   wherein calibration coefficients S and B are determined by:
   a measurement of a first voltage output of the infrared sensor at a first temperature such that $V_1=S(T_O^B-T_A^B)$;
   a measurement of a second voltage output of the infrared sensor at a second temperature such that $V_2=S(T_A^B-T_{REF}^B)$;
   a combination of the first voltage output and the second voltage output such that $V_2/V_1=(T_O^B-T_A^B)/(T_A^B-T_{REF}^B)$
   a determination of B using numerical iteration; and
   a determination of S by solving $V_1=S(T_O^B-T_A^B)$ for S such that $S=V_1/(T_O^B-T_A^B)$ using the measured value for $V_1$ and the determined value for B.

7. A system in accordance with claim 6 wherein the values of S and B to are used generate the lookup table of the output voltage of an infrared sensor to the temperature sensed by the infrared sensor, $V(T_O, T_A)$ versus the temperature $T_O$ of the object at a plurality of temperatures.

8. A system in accordance with claim 5 wherein the first voltage $V(T_A, T_{REF})$ is determined using $V(T_A, T_{REF})S(T_O^B-T_A^B)$.

9. A system in accordance with claim 5 wherein the second voltage, $V(T_O, T_{REF})$ is determined using $V(T_O, T_{REF})=(T_O, T_A)+(T_A, T_{REF})$.

10. A system in accordance with claim 5 wherein said temperature sensor comprises at least one of a thermistor, a silicon temperature sensor, and an RTD.

11. A system in accordance with claim 5 wherein said infrared sensor comprises a thermopile.

12. A computer program embodied on a computer readable medium for detecting a temperature $T_O$ of a remote object, said program comprising a code segment that:
   stores in memory, a lookup table relating an output voltage of an infrared sensor to a temperature sensed by the infrared sensor $V(T_O, T_A)$;
   determines a temperature sensor voltage output corresponding to a temperature $T_A$ proximate the infrared sensor;
   determines a first voltage as a function of the temperature $T_A$ proximate the infrared sensor and a reference temperature $T_{REF}$, $V(T_A, T_{REF})$ where $V(T_A, T_{REF})=S(T_O^B-T_A^B)$;
   determines a second voltage as a function of the temperature of the object $T_O$ and the reference temperature $T_{REF}$, $V(T_O, T_{REF})$ by combining the determined temperature sensor voltage output and the first voltage;
   determines a temperature of the object $T_O$ from the lookup table using the second voltage; and
   outputs the determined temperature,
   where, $T_O$=object temperature in ° K
   $T_A$=ambient temperature in ° K
   $S$=sensitivity coefficient
   $B$=calibration coefficient.

13. A computer program in accordance with claim 12 further comprising a code segment for generating the lookup table that:
   measures the infrared sensor output at two temperatures of the object and the temperature $T_A$ proximate the infrared sensor;
   determines calibration coefficients S and B from the measured temperatures;
   determines temperature sensor voltage output corresponding to a temperature $T_A$ proximate the infrared sensor, $V(T_O, T_A)$.

14. A computer program in accordance with claim 12 wherein a voltage output of the infrared sensor is given by $V=S(T_O^B-T_A^B)$, where
   $V$=output voltage from thermopile,
   $T_O$=object temperature in ° K
   $T_A$=ambient temperature in ° K
   $S$=sensitivity coefficient
   $B$=calibration coefficient, and
   the computer program further comprises a code segment for determining the calibration coefficients S and B that:
   measures a first voltage output of the infrared sensor at a first temperature such that $V_1=S(T_O^B-T_A^B)$;
   measures a second voltage output of the infrared sensor at a second temperature such that $V_2=S(T_A^B-T_{REF}^B)$;
   combines the first voltage output and the second voltage output such that $V_2/V_1=(T_O^B-T_A^B)/(T_A^B-T_{REF}^B)$
   determines B using numerical iteration; and
   determines S by solving $V_1=S(T_O^B-T_A^B)$ for S such that $S=V_1/(T_O^B-T_A^B)$ using the measured value for $V_1$ and the determined value for B.

15. A computer program in accordance with claim 13 further comprising a code segment that generates the lookup table of the output voltage of an infrared sensor to the temperature sensed by the infrared sensor, $V(T_O, T_A)$ versus the temperature $T_O$ of the object at a plurality of temperatures using the determined values of S and B.

16. A computer program in accordance with claim 12 further comprising a code segment that determines a second voltage, $V(T_O, T_{REF})$ using $V(T_O, T_{REF})=(T_O, T_A)+(T_A, T_{REF})$.

* * * * *